United States Patent

Dioguardi et al.

Patent Number: 6,055,706
Date of Patent: May 2, 2000

[54] HINGE FOR THE AUTOMATIC MECHANICAL CLOSURE OF SPECTACLE ARMS

[75] Inventors: Franco Dioguardi, Ponte Nelle Alpi; Marco Sottsass, Pieve di Cadore, both of Italy

[73] Assignee: Adriano Gaiani, Belluno, Italy

[21] Appl. No.: 09/091,244

[22] PCT Filed: Dec. 11, 1996

[86] PCT No.: PCT/EP96/05530

§ 371 Date: Apr. 28, 1998

§ 102(e) Date: Apr. 28, 1998

[87] PCT Pub. No.: WO97/22035

PCT Pub. Date: Jun. 19, 1997

[30] Foreign Application Priority Data

Dec. 12, 1995 [IT] Italy ................................ BL95A0020

[51] Int. Cl.[7] .............................. E05D 1/00; E05C 17/64
[52] U.S. Cl. ................................ 16/226; 16/342; 16/354
[58] Field of Search .............................. 16/307, 228, 285, 16/354, 342; 351/113, 114, 115, 111

[56] References Cited

U.S. PATENT DOCUMENTS

| | | | |
|---|---|---|---|
| 1,583,842 | 5/1926 | Keene | 16/285 |
| 3,110,057 | 11/1963 | Urich | 16/228 |
| 3,549,247 | 12/1970 | Rabinowitz | 351/113 |
| 3,586,425 | 6/1971 | Gilman . | |
| 3,600,068 | 8/1971 | Jolicoeur . | |
| 3,671,111 | 6/1972 | Okner | 351/113 |
| 3,923,384 | 12/1975 | Leblanc . | |
| 4,491,436 | 1/1985 | Easton | 16/228 |
| 4,951,349 | 8/1990 | Dietrich et al. | 16/228 |
| 5,592,243 | 1/1997 | Chao | 16/228 |
| 5,631,719 | 5/1997 | Chao | 16/228 |
| 5,867,872 | 2/1999 | Katoh | 16/354 |

FOREIGN PATENT DOCUMENTS

| | | |
|---|---|---|
| 2 700 397 | 7/1994 | European Pat. Off. . |
| 413556 | 8/1910 | France . |

*Primary Examiner*—Chuck Y. Mah
*Attorney, Agent, or Firm*—Evenson, McKeown, Edwards & Lenahan, PLLC

[57] ABSTRACT

The invention is concerned with a new constructive form of hinge for junction and opening of the arms (A) on the front (F) of the glasses, and being the automatic closure of the arms (A), when the glasses aren't being worn. The innovative peculiarity of the invention is to provide the presence of an elastic means (6), operating on a pin (26) of a gear (27), arranged in direct grip with a crown wheel section (11) of a disk (10), where it determines and regulates the movement of the gear (27), the gear (27) itself being solid to the arm (A) to open, whereas the crown wheel section (11) is fixed with the extremity of the hinge of front (F) of glasses.

10 Claims, 3 Drawing Sheets

HINGE FOR THE AUTOMATIC MECHANICAL CLOSURE OF SPECTACLE ARMS

The invention is concerned with a new constructive form of hinge for junction and opening of the arms on the front of glasses, and being the automatic closure of the arms, when the glasses aren't being worn. The innovative peculiarity of the invention is to provide the presence of an elastic means, operating on a pin of a mechanism, arranged in direct grip with a section of crown wheel, where it determines and regulates the movement of the gear, the gear itself being solid for the arm to open, whereas the section of crown wheel is fixed to the extremity of the hinge of front of glasses.

The hinge of the arms to the front of glasses has the evident aim to allow the opening and closing of the arms themselves, relative to the front, which supports them.

Countless constructive solutions of hinges for arms of glasses are well-known: from the most basic, consisting of simple eyelets, applied on the extremities of the joining parts and connected with a screw, acting as a pin, to the most complicated, which give assurance of a correct elasticity to the opened bars, so as to adapt themselves to the different anatomic conformations of those people, who wear the same type or model of glasses.

The use of one or other existent types of hinge already depends on the quality of the product, that one wants to obtain, on the pertinent prime costs, on the encumbrances of the hinges or other factors of constructive or commercial type.

But at the moment no type of hinge resolves the important and specific requirements of people, who wear glasses: that is the possibility of a mechanical and automatic closing of the arms on the front, when glasses aren't being worn. Junctions of arms on the front with a simple interposition of a helical—or another type of spring are well-known with a tendence to a continuous closure of the arms on the front: however the same elasticity makes the opening of the arms difficult, because these aren't hinged at the front, causing in this way the deformation of the whole glasses.

The problem underlying to this invention is to create a hinge, especially for the junction of the arm with the front of the spectacles, which consents a normal opening of the arms on the front, without deformation, being caused by a lack of thrust balance, for want of pins or centres of hinges, even securing the possibility of an automatic closure of the arms, when glasses aren't in use or when the opening action on the arms themselves has stopped.

Another problem underlying to the invention is to secure an opening and closing of the arms, which assures the symmetry and synchronisation especially during the automatic closing of the arms.

Another problem underlying to the invention is that of creating a hinge, which secures the correct pressure of the arms on the temples, as in the normal and well-known elastic hinges, though guaranteeing the automatic closure.

Hence the subject matter of the invention is a hinge for the automatic mechanical closure of spectacle-arms, determined to assure the automatic closure of the arms when the glasses are not being worn or they are not opened, charactarized by that arms are connected to the extremity of front, by means of a cover guided and contained in a box which box contains and fixes the extremity of an elastic means, working on the same cover with the interposition of gears or other mechanical regulators of the turning-friction, for regulating the reaction thrust of the elastic means, tending to the closure of arm on the extremity of front.

According to an advantageous embodiment of the invention the elastic means have an end connected to box, which is fixed on the extremity of front and presents an opposite end, applied to a stem of a crown wheel, which is directly attached to a toothed section of a disk, connected to box, while stem of crown wheel is attached to cover, which is connected to arm for transferring the crown wheel section having a width corresponding to the maximum width of the opening of arm.

According to another advantageous embodiment of the invention the transference of the opening of arm on front determines the rotation of cover on a pin and the transference of crown wheel on toothed section with consequent transference of extremity of elastic means and relative accumulation of thrust for the closure reaction, and for stopping the thrust that reaction being regulated by crown wheel on toothed section as well as braking and temporal distributing systems of such reaction.

According to a further advantageous embodiment of the invention the cover, fixed to arm, is connected to box fixed to the extremity of front with interposition of an elastic means, acting to amass reaction strength, when cover has been turned on box to push arm to its closure on front, when the opening action has stopped, being said reaction contrasted by a ring or a ring sector, interposed between the cylindrical surfaces or contact between cover and box.

According to a still further advantageous embodiment of the invention for determining and regulating the reaction thrust, during the strain of the opening of arm on front, there is the sole presence of an intermediate body, collocated between the cylindrical surfaces or contact surfaces between cover and box, this intermediate body having been given suitable elastic friction qualities, for distributing through time the closure reaction of arm on front.

According to a still further advantageous embodiment of the invention arm is connected to disk, which has a pin with an angular extremity, whereas its lateral surface is in contact with the friction ring, interposed on the internal surface of box, to this box being given a balance-space with a centering space having an extended area destined to allocate and to determine the rotation width of the angular extremity of disk and consequently of arm.

According to a still further advantageous embodiment of the invention the rim of box is performed in fine thickness, which can be bent during the application of disk and of elastic means also with the aid of the maximum diameter of disk, determining its position and its holding within the same box, without the necessity of covers or fixing screws.

According to a still further advantageous embodiment of the invention for the automatic re-entry of the arm there are the elastic means, disposed in box and having an extremity fixed on the same box and so fixed on front for reacting with the arm, while the opposite extremity is fixed to a revolving disk or to the turning part or to disk, both connected to the revolving arm.

The invention is further illustrated by the following detailed description of preferred embodiments with the aid of 10 figures, reproduced on the enclosed three sheets, only indicative and not restrictive:

FIG. 5 represents a vertical view of a box, in conformity with the level in section V—V of FIG. 6;

FIG. 6 represents a frontal view of the box in FIG. 5;

FIG. 7 represents a view in axial-section of a disk with a regulation-foot of the rotation-width;

FIG. 8 represents a vertical view in conformity with the level of section VIII—VIII in FIG. 7;

FIG. 9 represents a perspective view of a spiral spring, whose extremities are folded by the hooking, which should be joined between the disk in FIG. 7 and the box in FIG. 5;

FIG. 10 represents a view in vertical section of hinge, created with the elements of FIGS. 5 to 9.

Figure 1:
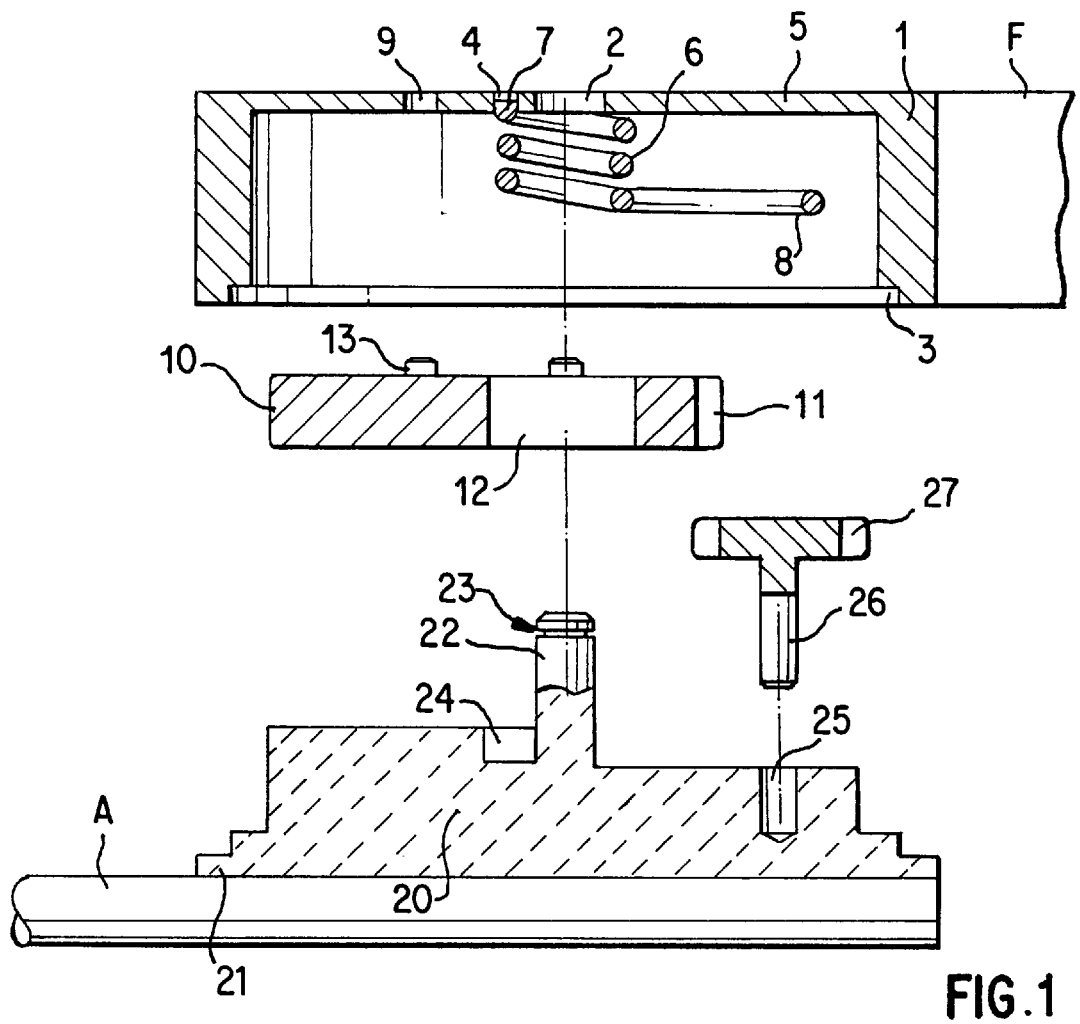
FIG. 1 represents a sight in the axial-section and in detail of the main parts constituting the hinge at issue.
Figure 2:
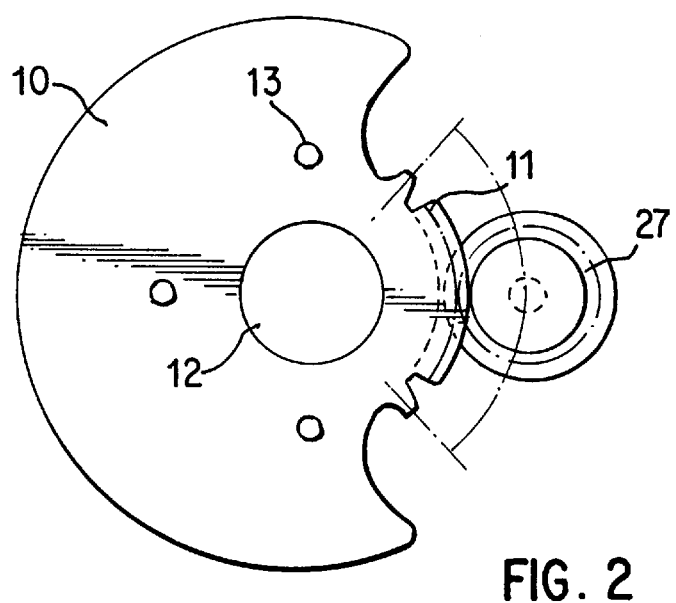
FIG. 2 represents a sight of the plan of two constructive details engaged within themselves.

The same details are represented in all the figures with the same reference numeral. Reference numeral 1 represents a cylindrical box, which is connected to the front of the glasses and which is provided with a hole 2 and moreover with a cylindrical background.

On a hole 4 of the bottom 5 of box 1 an extremity of an elastic means 6, constituted for example by a spiral of harmonic steel, and having opposite extremities 8 appropriately hooked.

Detail 10 represents a disk having a crown wheel section 11, whose angular wideness is the same as that of the opening which is wanted to be created with arm A on front F.

This cog disk 10 is also provided with a passing hole 12 with a sufficient diameter for the passage of the helicoidal spring 6 or of an equivalent elastic means. The same disk 10 is provided with cut off pins 13, destined to be allocated in the holes 9 of bottom 5, to stop its rotation in box 1.

Detail 20 represents a disk or a cylindrical cover to associate with box 1 for its closure and for containing the moving system of arm A.

Arm A is soldered or otherwise solidly fixed on the outside 21 of the cover 20 and it is therefore involved in the rotation of the same cover 20, inside box 1.

Cover 20 is provided with an axial pin 22, having allocation 23 for the seeger-ring or for another well-known blocking system and allocation 24, to contain the elastic means 6 and its hooked arm 8.

The same cover 20 also has a hole 25, which bears and puts in axial position the pin 26 of a crown wheel 27, having a nominal diameter and a constructive form suited to engage with the crown wheel section 11 of the disk 10. During the assembly of the mentioned hinge, before applying pin 26 in section 25, the same pin 26 must be threaded in the sole extremity 8 of the elastic means 6.

Then the elastic means 6 themselves are threaded in hole 12 of disk 10, fixing the opposite extremity 7 in hole 4 of the bottom 5 of box 1 and thus setting the disk 10 on the same bottom 5 of box 1, so that pins 13 are placed in the holes 9 of the same box 1.

With the application of the cover 20 on box 1 it is obtained the passage of pin 22 in the spiral section of the elastic means 6, besides the placing of the same elastic means 6 in space 24, whereas gear 27 joins in the crown wheel section 11 of disk 10.

Figure 3:
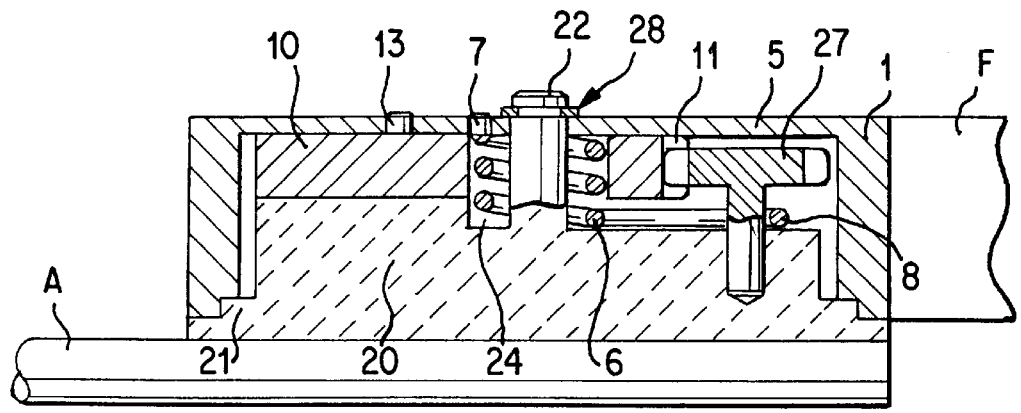
FIG. 3 represents a sight in axial-section of the parts on FIG. 1, combined to form the considered hinge.

The application of the seeger-ring 28 assures the stability of the union between arm A and front F by the mentioned hinge, as to be taken from FIG. 3.

It is clear that union of cover 20 with box 1 must be created so that cog wheel 27 can have the best rotation on the wheel-section 11, positioning itself, so that the arm A is completely closed or completely opened, relative to front F.

A slight difference of reacting ability in the two distinct elastic means 6, applied on the two hinges of both extremities of a same front F, assures for the two arms A different times of automatic closure on front F, avoiding the crossing of the two arms. It is possible to obtain the same result using a different number of cogs or another form of gear 11–27, used for the left arms.

Having described these details of the invention and its simple assembly system, the obtained advantages and their correspondence in the specified objects appear clear.

It is evident that with the opening of arm A, cover 20 must turn within seat 3 of box 1, pulling also pin 26 and cog wheel 27, besides the extremity 8 of the elastic means 6.

The opening of arm A is gradual and regulated by the rotation of cog wheel 27 on the cog part 11 of the fixed disk 10, while the extremity 8 of the elastic means 6 accumulates reaction power.

The maximum opening of arm A is assured by the largest width of cog part 11, because wheel 27 is blocked by the disk rim 10. In this opening, however the elastic means 6 assure a suitable pressure on the temples, as in normal and elastic hinges.

By stopping the opening action of arm A, the reaction of elastic means 6 can be obtained, which automatically takes arm A into the closure position, inverting the movement of cog wheel 27 on cog section 11 and so realizing all of the mentioned aims.

Figure 4:
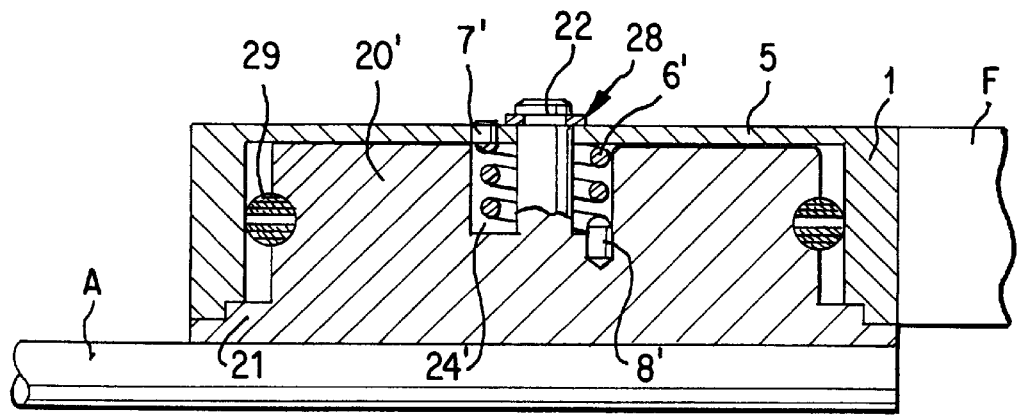
FIG. 4 represents a first constructive variant of the solution on FIG. 3.
Figure 5:
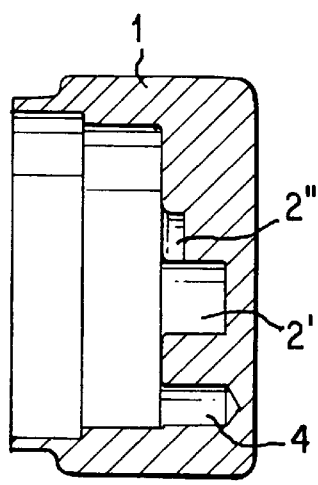
FIGS. 5 to 10 represent the illustration of a further constructive solution and particularly.
Figure 6:
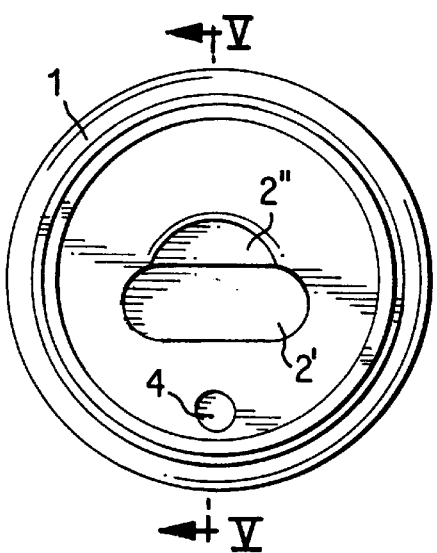
Figure 7:
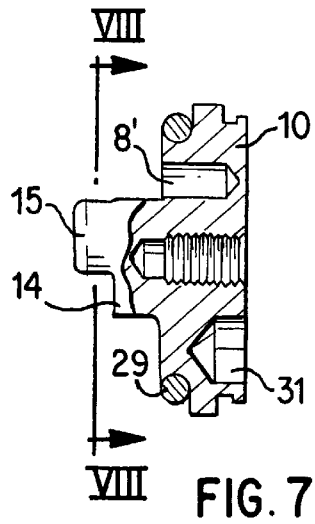
Figure 8:
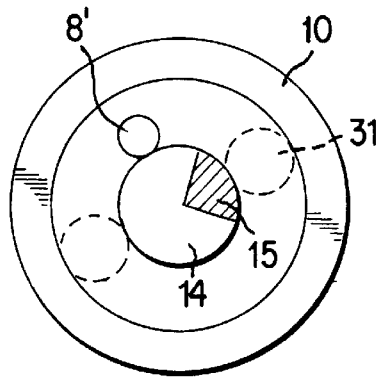
Figure 9:
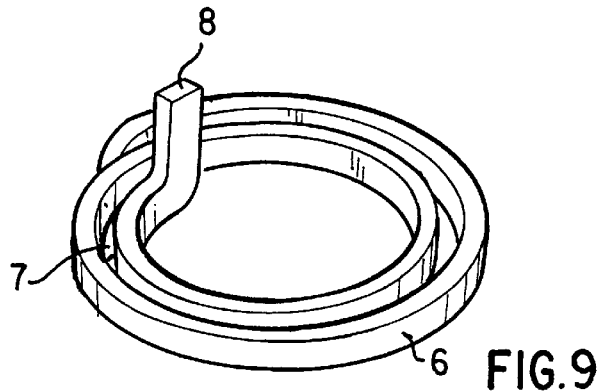
Figure 10:
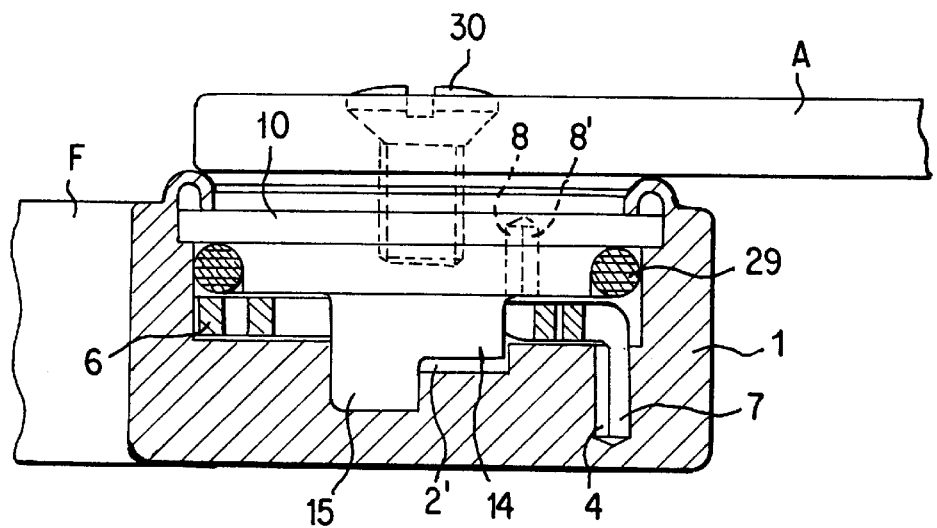

According to a first constructive variant of the invention, illustrated in FIG. 4 for an even more economic embodiment innovation, it is possible to eliminate the toothing between cog section 11 and crown wheel 27, by making a cylindrical cover 20 with a section 24 to contain the spring 6. This spring 6 has an extremity 7, fixed on base 4, as already described, whereas the opposite extremity 8 is fixed to the cover 20' itself.

Between the side-walls of box 1 and of cover 20' it is interposed a ring 29, made of an elastic substance, qualified to produce a minimun friction, in order to gradually overcome the force of opening or spreading of the arm, so as to be gradually won by the thrust reaction of spring 6', during the closure phase. Perimetrical pendants or beatings determine the maximun width and opening. A further and even more economic solution foresees also the elimination of the elastic means 6', fixing the closing reaction by the elasticity and the friction of ring 29, interposed between the walls of box 1 and of cover 20 during opening.

A further possibility of changing the described mechanism is given by the replacement of gear 27 and of the crown wheel section 11 with spherical or cylindrical elements, which turn on a cylindrical sector of disk 10, or with the interposition of cylindrical segments in an antifriction substance, made to regulate with friction the thrust reaction of an elastic means 6, acting as a closing agent for arm A on front F. These devices can naturally be adopted also together.

Referring to FIGS. 5 to 10 it is obtained the same application of an elastic means 6 between box 1 and disk 10, the elastic means themselves being provided with an extremity 7 fixed on hole 4 of box 1 and with an opposite extremity 8 fixed to hole 8 of disk 10.

The mentioned disk 10 presents an allocation for an elastic holder 29, working with friction on the internal surface of box 1, as already has been illustrated before.

The disk 10 itself presents a cylindrical stem 14, fitted to wrap spiral 6 as well as the centering of the disk 10 itself in allocation 2'. The cylindrical stem 14 presents moreover an angled extremity 15, destined to be allocated in the extended area 2", to fix the maximum rotation of disk 10 and of arm A joined to it.

A characteristic of extremity 15 is to present two radial surfaces between them, indicatively orthogonal, for better contact with the walls of hole 2'.

According to this constructive variant the rim 3 of box 1 is sufficiently thin to be bent during the assembly of the hinge, so as to automatically block the outlet for disk 10 and for the elastic means 6. Bending is favoured by the minimum clearance existing between the maximum diameter of disk 10.

Arm A is joined to disk 10 through a screw 30 or another well-known fixing system, having the possibility to create pins or outlets fitted to allocate themselves in areas 31 of the same disk 10 for an improved stability.

What is claimed is:

1. A hinge for automatically mechanically closing a temple arm of a spectacle frame having a front portion when not being worn, the hinge comprising:

a cylindrically-shaped box adapted to be coupled to the front portion of the spectacle frame;

a cylindrically-shaped cover body adapted to be coupled to an end area of the temple arm, the cover body being rotationally disposed in the box;

means, disposed in the box, for regulating rotary motion between the cover body and the box;

an elastic member having first and second ends, the elastic member being arranged in the box with the first end being fixed to the box;

wherein the elastic member exerts a force on the cover body via the regulating means such that a reaction force developed between the elastic member and the regulating means ensures a regulated closure of the temple arm of the spectacle frame.

2. The hinge according to claim 1, wherein said regulating means comprises:

a disk having a toothed section over a defined rotational angle, the disk being connected to the box;

a crown wheel having a stem, the stem being attached to the cover body such that the crown wheel interacts with the toothed section of the disk;

wherein the second end of the elastic member is applied against or coupled to the stem of the crown wheel, whereby the defined rotational angle corresponds with a maximum opening angle of the temple arm.

3. The hinge according to claim 1, wherein the regulating means comprises:

at least a ring sector interposed between an inner side wall of the cylindrically-shaped box and an exterior side wall of the cylindrically-shaped cover body;

wherein the ring sector, when the cover body rotates within the box, produces a friction force which counters the reaction force of the elastic member.

4. The hinge according to claim 1 wherein the cover body comprises a disk having a stem extending from an inwardly facing side of the disk, an end of the stem having a defined angularity;

further wherein the regulating means comprises a friction ring interposed between an internal surface of the box and an external surface of the disk; and wherein a bottom surface of the box includes a centering space for receiving the stem of the disk, the centering space including an extended area for receiving the angularly defined end of the stem, the extended area being sized to limit the rotation of the end of the stem.

5. The hinge according to claim 4, wherein the box has a rim portion, the rim portion being thin-walled and bent inwardly over the cover body to secure the cover body in the box.

6. The hinge according to claim 4, wherein for automatic mechanical closure of the hinge, the second end of the elastic member is fixed to one of:

a disk forming the cover body adapted to be coupled to the temple arm;

a gear which couples with the cover body adapted to be coupled to the temple arm, the gear being part of the regulating means; and a cylindrically-shaped body portion of the cover body adapted to be coupled to the temple arm.

7. The hinge according to claim 1, wherein the box has a rim portion, the rim portion being thin-walled and bent inwardly over the cover body to secure the cover body in the box.

8. The hinge according to claim 7, wherein for automatic mechanical closure of the hinge, the second end of the elastic member is fixed to one of:

a disk forming the cover body adapted to be coupled to the temple arm;

a gear which couples with the cover body adapted to be coupled to the temple arm, the gear being part of the regulating means; and a cylindrically-shaped body portion of the cover body adapted to be coupled to the temple arm.

9. The hinge according to claim 1, wherein for automatic mechanical closure of the hinge, the second end of the elastic member is fixed to one of:

a disk forming the cover body adapted to be coupled to the temple arm;

a gear which couples with the cover body adapted to be coupled to the temple arm, the gear being part of the regulating means; and a cylindrically-shaped body portion of the cover body adapted to be coupled to the temple arm.

10. A hinge for a spectacle frame having a front portion and a temple arm, the hinge comprising:

a cylindrically-shaped box adapted to be coupled to the front portion of the spectacle frame;

a cylindrically-shaped cover body adapted to be coupled to an end area of the temple arm, the cover body being rotationally disposed in the box;

means for regulating a reaction force developed by rotation of the cover body within the box, said regulating means being solely an intermediate body interposed between an inner side wall cylindrical surface of the box and an outer sidewall cylindrical surface of the cover body, said intermediate body having a defined elasticity and producing a defined friction between the cover body and the box such that the intermediate body regulates the reaction force throughout a closing of the hinge.

* * * * *